April 5, 1927.　　　　　　　　　　　　　　　　　　　1,623,362
J. F. RULE
MEANS FOR FORMING AND DELIVERING CHARGES OF MOLTEN GLASS
Filed Aug. 22, 1921　　　　3 Sheets-Sheet 1

INVENTOR
J. F. Rule

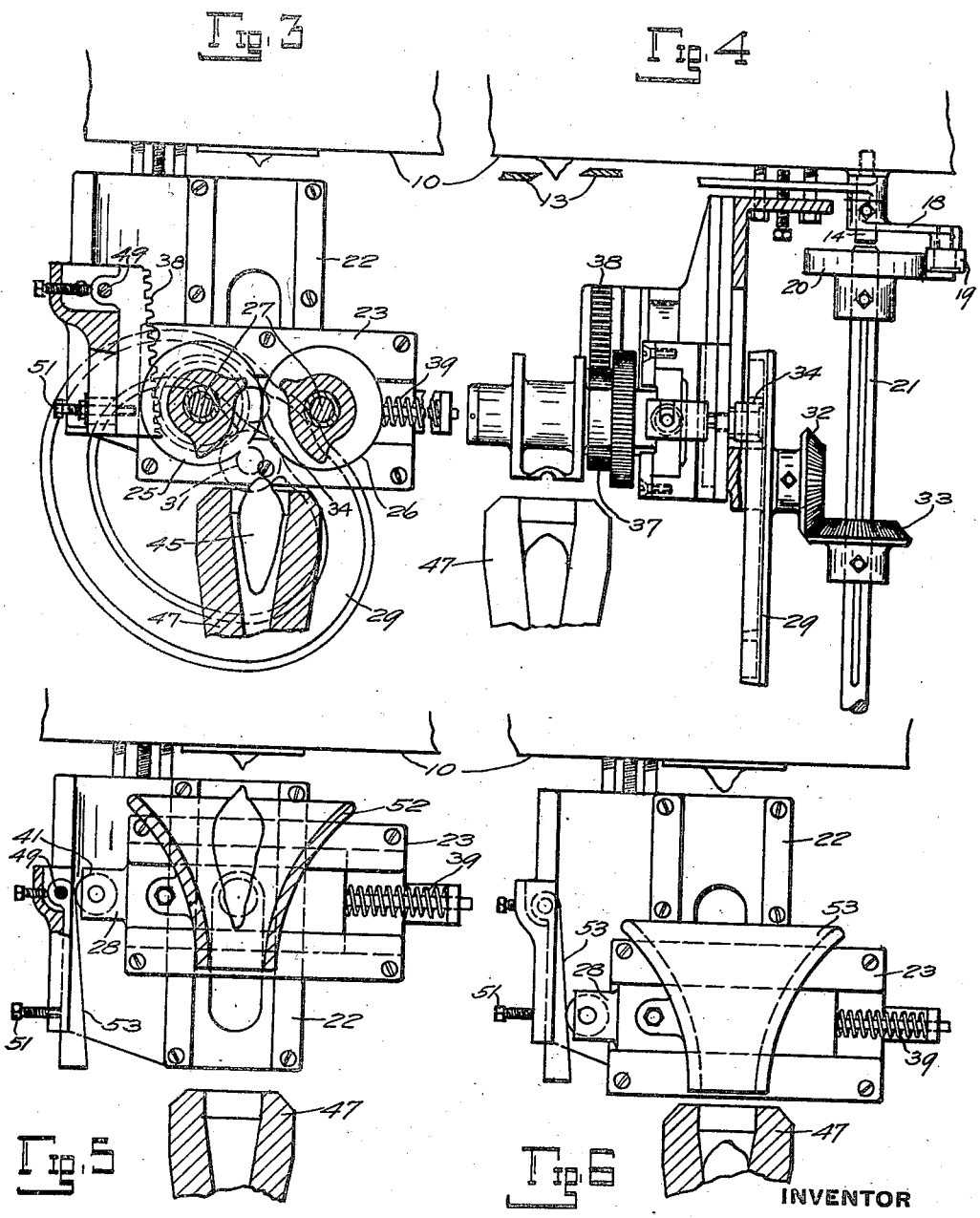

April 5, 1927.                  J. F. RULE                        1,623,362
              MEANS FOR FORMING AND DELIVERING CHARGES OF MOLTEN GLASS
                     Filed Aug. 22, 1921        3 Sheets-Sheet 3
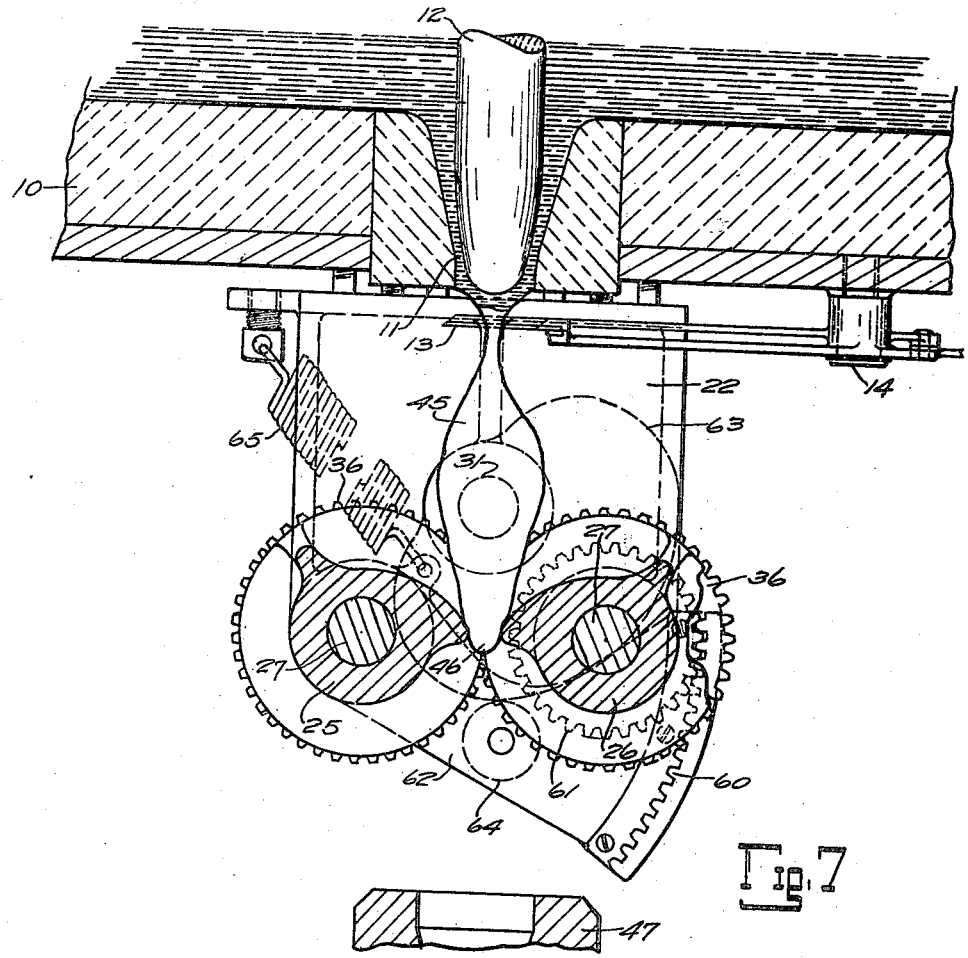
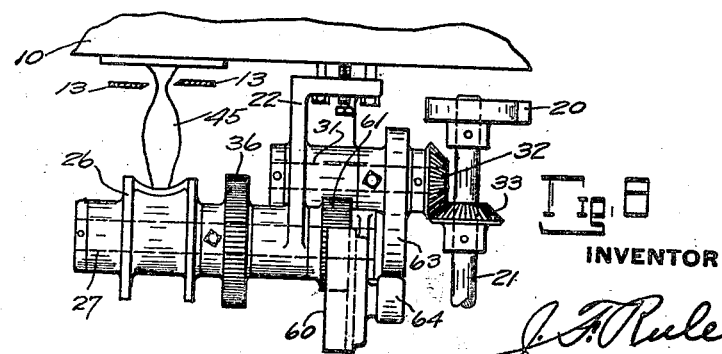
INVENTOR
J. F. Rule.

Patented Apr. 5, 1927.

1,623,362

UNITED STATES PATENT OFFICE.

JOHN F. RULE, OF TOLEDO, OHIO, ASSIGNOR TO THE OWENS BOTTLE COMPANY, OF TOLEDO, OHIO, A CORPORATION OF OHIO.

MEANS FOR FORMING AND DELIVERING CHARGES OF MOLTEN GLASS.

Application filed August 22, 1921. Serial No. 494,124.

My invention relates to apparatus for producing and shaping gobs or charges of molten glass and delivering them to the molds of a glass shaping machine. It is customary in the art to produce gobs of glass by causing the glass to issue from an outlet orifice in the bottom of a container, periodically severing the suspended glass at a point below said orifice and dropping or conveying the gobs thus produced to forming molds.

An object of my invention is to provide means for shaping the gobs during their passage to the molds, which shaping operation may be commenced about the time the gob is severed. The invention also provides for guiding the gobs into the molds which may be carried on a continuously rotating mold carriage. The gob shaping means may be arranged to move with the gob during the shaping and transfer of the latter to the molds.

In one form of my invention the gob shaping means comprises a pair of rolls suitably recessed to form a shaping cavity or mold through which the gob is passed and by which it is shaped during its passage to the mold, said shaping rolls being also arranged to move downwardly and forwardly with the gob, whereby the downwardly moving gob is advanced with the traveling mold and accurately guided into the mold.

Other objects of the invention will appear hereinafter.

In the accompanying drawings:

Figure 3 is a similar view, but with the parts in a different position.

Figure 4 is a part sectional side elevation of the apparatus.

Figure 5 is a sectional elevation of a modification in which a funnel guide is used.

Figure 6 is a view of the same with the parts in a different position.

Figure 7 is a sectional front elevation of a further modification.

Figure 8 is a side elevation of the same.

Figure 1:
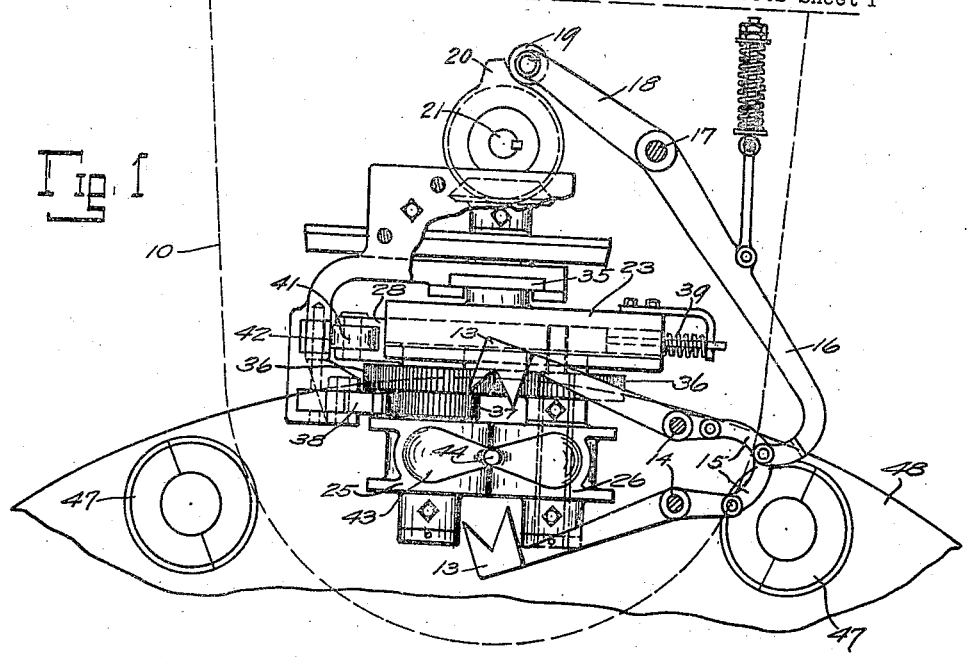
Figure 1 is a plan view of an apparatus constructed in accordance with my invention.
Figure 2:
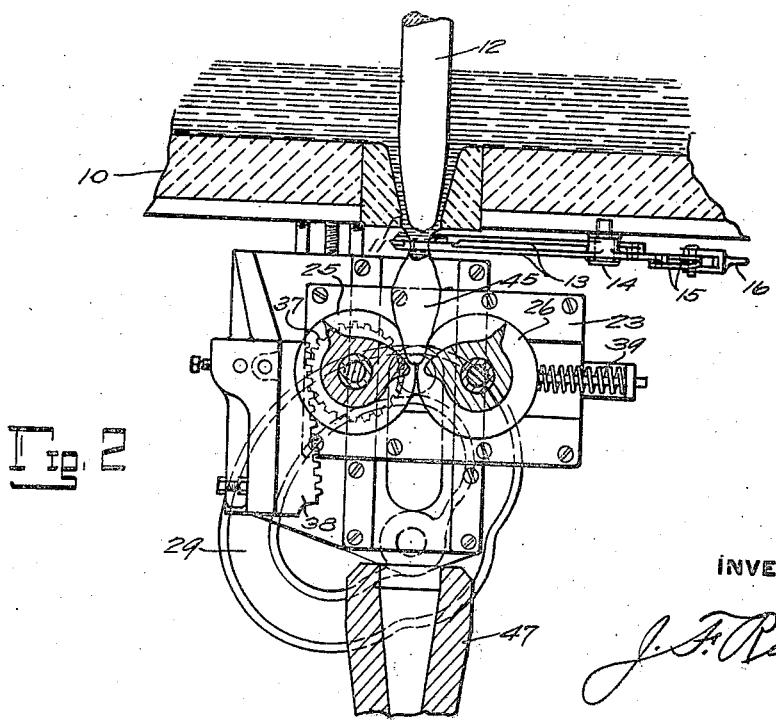
Figure 2 is a part sectional front elevation of the same.

Referring particularly to Figures 1 to 4, molten glass is supplied from a receptacle 10 which may be a furnace extension or boot having an outlet opening 11 in the bottom thereof through which the glass issues. The flow of glass is regulated and controlled in a well known manner by a vertically reciprocating clay plug 12. A pair of shear blades 13 are operated periodically in synchronism with the movements of the plug to sever the suspended gobs of glass. The shear blades swing about pivots 14 and are actuated by toggle links 15 and an arm 16, the latter attached to a rock shaft 17 to which is also attached a rock arm 18 carrying a roll 19 running on a cam 20. This cam is mounted on a continuously rotating drive shaft 21.

The mechanism for shaping the gobs and guiding them to the molds will now be described. A stationary frame 22 is supported from the frame-work of the boot 10. A block 23 is mounted to reciprocate vertically on the frame 22, the latter being formed with a guideway to receive an extension 35 on the block 23. A pair of gob shaping and directing rolls 25 and 26 are mounted on shafts 27 supported on a slide 28 movable horizontally in a guideway formed in the block 23. These rolls are arranged with their peripheries in contact. The block 23 is reciprocated vertically by a cam 29 on a shaft 31. A gear 32 on said shaft is driven by a gear 33 on the drive shaft 21, whereby the cam 29 is rotated continuously, being given one complete rotation for each revolution of the drive shaft. A roll 34 on the block 23 runs in the cam track so that the movement of the cam reciprocates the block 23 vertically.

Secured to the shafts 27 are intermeshing gears 36. A pinion 37 on one of said shafts runs in mesh with a stationary rack 38 on the frame 22. The pinion 37 is held in mesh with the rack by a spring 39 which bears against the slide bar 28. The latter may be provided with a roll 41 which bears against a surface 42 parallel with the rack 38. As the block 23 is moved up and down by the cam, the rack operates, through the pinion 37 and gears 36, to rotate the forming rolls 25 and 26. These are formed with gob shaping recesses or pockets 43 in their peripheries. These recesses are comparatively narrow and shallow at their lower ends and are flared upwardly and made deeper at their upper ends, so that as the rolls rotate with their contacting peripheries moving downward, there is provided an opening 44 preferably circular and of gradually increasing diameter. The pockets or concave surfaces 43 thereby serve to impart a tapered shape to a gob of glass 45 as the latter is carried downward between the rotating rolls. It will be understood that the shape of the forming surfaces 43 may be varied to correspond to the shape which it is desired to impart to the gobs. The forming rolls are oscillated from the initial position shown in Figures 1 and 2 to the position shown in Figure 3 and back to the Figure 1 position.

The movements of the rolls are preferably so timed that they commence to rotate just before or at the time the shears operate to sever the gob. However, the rolls may commence their movement at a somewhat earlier or later period with respect to the shear operation, depending on the results desired and various factors such as the size and shape of the gobs and the rate at which they are formed. The forming rolls are preferably rotated rapidly during their gob forming movement so that they are in contact with the glass only a very short time, whereby objectionable chilling of the glass is avoided. The surfaces 43 are preferably so shaped that before they commence their rotative movement they provide a restricted annular opening through which the tip 46 of the gob (Fig. 7) may protrude. This prevents any surface contact with the lower end of the gob before it enters the mold. Said end may also draw down somewhat due to the action of gravity, after the glass comes in contact with the walls of said opening but before the shaping rolls commence their movement. The gobs 45 after passing between the shaping rolls may drop directly into molds 47 on a continuously rotating carriage 48 of a glass forming machine.

The rack 38 is inclined so that the shaping rolls are given a downward and forward movement while guiding and shaping the gob. In this manner, the gob as it descends is caused to advance in the direction in which the mold 47 is moving and preferably at the same speed as the mold. The gob is thus moving forward with the mold as it enters the latter and is accurately guided into the mold. The rack 38 is mounted for adjustment about a pivot rod 49 so that the inclination of the rack may be adjusted. A set screw 51 holds it in its adjusted position. The speed at which the shaping rolls are rotated may be such that there is little or no retardation thereby of the gob as it drops. In other words, the shaping surfaces move downwardly with the glass at substantially the same speed that the glass would fall under the influence of gravity alone.

Figures 5 and 6 illustrate a modification wherein a funnel guide 52 is substituted for the shaping rolls. This funnel is carried by the slide 28 mounted in the vertically reciprocating block 23 and is moved up and down in the same manner as the shaping rolls. It is given a forward movement during its descent by an inclined guide 53 against which the roll 41 bears.

Figures 7 and 8 illustrate a further modification in which the shafts 27 of the shaping rolls are mounted directly in the frame 22 so that there is no up and down movement of the rolls. The rolls are oscillated by means of a rack 60 running in mesh with a pinion 61 on one of the roll shafts. Said rack is carried by a segment arm 62 mounted to oscillate about the other roll shaft. A cam 63 running in contact with a roll 64 on the segment 62, actuates said rack. The roll 64 is held against its cam by a spring 65.

Modification may be resorted to within the spirit and scope of my invention.

What I claim is:

1. The combination of means for forming and suspending a bare gob of glass, means for severing the bare suspended gob, and shaping means for receiving the bare gob directly as it is severed and shaping it while it moves downward away from the severing means, said shaping means comprising shaping surfaces which contact with the glass and move downward therewith at substantially the same speed as the glass.

2. The combination of means for forming and delivering a bare gob of molten glass, permitting it to drop en masse by gravity, and guiding means comprising surfaces which engage the gob as it drops and move downwardly therewith at substantially the same speed as the gob while the latter moves bodily downward by gravity.

3. The combination of means for forming, suspending, severing and dropping a bare gob of molten glass, and automatic means to surround and shape the gob while it drops by gravity, said shaping means comprising shaping surfaces which engage and move downward with the glass at substantially the same speed as the glass during said shaping of the gob.

4. The combination of means for forming and suspending a gob of molten glass, means for severing and dropping the gob, and automatic means beneath the severing means comprising a shaping surface to engage the gob and to move downward therewith at substantially the same speed and shape the gob during said downward movement.

5. The combination of means for forming, suspending, severing and dropping a gob of molten glass, and automatic means to engage the gob and move downward therewith at substantially the same speed as the latter would fall under the influence of gravity and shape the gob during said downward movement, said shaping means also having a forward movement in a horizontal direction during such shaping, whereby the gob is given a combined downward and forward movement.

6. The combination of means to deliver a charge of molten glass and permit it to drop by gravity, and a mechanical shaping and guiding means comprising shaping surfaces arranged to operate on the gob as it drops and move bodily downward therewith at substantially the same speed as the glass while in contact therewith.

7. The combination of a container for molten glass having a discharge opening through which the glass issues and from the walls of which the glass is suspended, a cutter operable periodically to sever the suspended masses of the issuing glass, and forming rolls arranged to shape each charge of glass after it is severed, said rolls providing the sole support for the charge from the time it is severed until it has been released from the rolls.

8. The combination of a container for molten glass having an outlet orifice through which the glass issues, a cutter operable periodically to sever the issuing glass and thereby produce individual masses or charges, and a shaping device having a shaping surface arranged to engage the glass and move downward with it at substantially the same speed as the glass after it is severed and simultaneously shape the mass, the glass after it issues being free from mechanical contact except by said shaping surface and cutter until after it has been shaped by said surface.

9. The combination of means for flowing molten glass and severing it into individual masses, of a pair of shaping rolls located beneath the severing means, the glass being free from mechanical contact during its passage from the severing point to the shaping rolls, said rolls having shaping surfaces to engage the glass and providing a passageway for the glass in the vertical line of flow of the glass at the severing point, and means to rotate said rolls and cause said shaping surfaces to move downward with the glass after it is severed and simultaneously shape the glass.

10. The combination of a receptacle to contain molten glass having an outlet opening in the bottom thereof through which the glass issues, shears beneath said opening, means to periodically operate said shears and sever masses from the issuing glass, a pair of shaping rolls directly beneath the severing point in position to receive the severed masses directly from the shears, the glass being free from mechanical contact during its passage from the severing point to the shaping rolls, and means to actuate said rolls and thereby shape a descending mass of glass after the shears have operated.

11. The combination of means to supply a flow of molten glass, shears operable periodically to sever individual masses therefrom, a pair of shaping rolls beneath said shears, and means to periodically oscillate said shaping rolls in synchronism with the operation of the shears.

12. The combination of a container for molten glass having an outlet opening in the bottom thereof through which the glass issues, means operating periodically to control the issuing glass, means arranged to engage the lower portion of a mass of glass issuing from said orifice and form a temporary support for said mass, means to sever the glass adjacent the orifice substantially at the instant of said engagement of said support, and means to then move said support downward with the downwardly moving glass.

13. The combination of means to form a suspended gob of glass, means to sever the suspended gob, a pair of shaping rolls arranged directly beneath said severing means in position to grip the gob immediately at the time of its severance, and means to rotate said rolls and thereby shape the gob after it has been severed, said rolls being the sole means to contact with the glass from the time of its severance until it has been released from the rolls.

14. The combination of means to form a suspended gob of glass, means to sever the suspended gob, a pair of shaping rolls arranged beneath said severing means, said rolls having gob shaping surfaces formed to impart a tapered shape to the gob, and means to rotate said rolls after the gob has been severed and thereby simultaneously shape the gob and feed it downward, said rolls being the sole means to contact with the glass from the time of its severance until it has been released from the rolls.

15. The combination of a horizontally traveling mold, means to form a gob of glass and drop it from a point above the mold, and guiding means arranged to move downward with the gob and forward with the mold for guiding the gob into the mold, said guiding means comprising surfaces which contact with the glass and move therewith at the same speed as the glass.

16. The combination of a horizontally traveling mold, means to form a gob of glass and drop it from a point above the mold, and gob shaping means comprising shaping surfaces moving downwardly and forwardly in contact with the glass and at the same speed as the glass by which the gob is simultaneously shaped and guided into the mold.

17. The combination of means to form and suspend a bare gob of molten glass, means to sever the gob and permit it to drop, and a shaping device comprising a shaping surface having a rolling contact with the gob as it drops, and moving downwardly therewith at substantially the same speed that the glass would fall under the influence of gravity alone.

18. The combination of means to form and suspend a bare gob of molten glass, means to sever the gob and permit it to drop, and means providing shaping surfaces arranged to engage opposite surfaces of the gob and roll in contact therewith as the gob drops, and moving downwardly therewith at substantially the same speed that the glass would fall under the influence of gravity alone.

19. The method of forming a charge of molten glass which consists in causing the glass to issue through an outlet, suspending the glass from the walls of the outlet, severing the suspended gob and permitting it to drop, and simultaneously with said severance bringing shaping surfaces into contact with the side walls of the glass and causing said surfaces to move downward in rolling contact with the falling glass.

20. The method of producing formed charges of molten glass which consists in causing the glass to move downwardly through an outlet opening in the bottom of a container, suspending the bare gob of glass from the walls of the outlet, severing the suspended gob and permitting it to drop, and shaping the dropping gob by shaping surfaces rolling on the glass and moving downward therewith at substantially the same speed as the glass would fall by gravity alone.

21. The combination of means for forming, suspending, severing and dropping a gob of molten glass, means to engage the gob at substantially the instant of severance thereof, said gob engaging means comprising gob shaping surfaces, and cam means to produce a downward movement of said gob shaping surfaces.

22. The combination of means for forming, suspending, severing and dropping a gob of molten glass, means comprising gob shaping surfaces arranged to engage the sides of the descending gob and mold it into a desired shape during its descent, and means to impart a downward movement to said surfaces during such molding operation, said surfaces being arranged and positioned to maintain the descending gob in an upright position throughout its descent.

23. The combination of means for forming, suspending, severing and dropping a vertically elongated charge of molten glass, supporting means to engage the charge of glass and hold it upright during its descent, and means for causing said supporting means to move downward with said charge.

24. The combination of means for forming, suspending, severing and dropping a vertically elongated charge of molten glass, supporting means to engage the charge of glass and hold it upright during its descent, and means for causing said supporting means to move downward with said charge through a predetermined distance, the supporting means being shaped to permit the charge to continue its downward movement and pass beyond the supporting means.

25. The combination of a container for molten glass having a downwardly directed outlet opening through which the glass issues and from the walls of which the glass is suspended in the form of an elongated mass, means to sever said mass at a point adjacent to the outlet, permitting the charge to descend by gravity, means for guiding and shaping the charge during its descent comprising an annular surface engaging the lateral surfaces of the charge and arranged to hold the charge vertical during its descent, and means for moving said annular surface downward through a predetermined distance during the descent of the charge and then arresting it, said annual surface providing an open passageway through which the charge may continue its downward movement to a position below and beyond the said guiding and shaping means.

Signed at Toledo, in the county of Lucas and State of Ohio, this 18th day of August, 1921.

JOHN F. RULE.